United States Patent Office 2,989,574
Patented June 20, 1961

2,989,574
METHOD OF INHIBITING POLYMER FORMATION IN ISOPARAFFIN-OLEFIN ALKYLATION
William C. Pfefferle, Florham Park, and Paul N. Rylander, Newark, N.J., assignors, by mesne assignments, to Engelhard Industries, Inc., Newark, N.J., a corporation of Delaware
No Drawing. Filed Aug. 19, 1958, Ser. No. 755,897
8 Claims. (Cl. 260—683.44)

Our invention relates to the alkylation of hydrocarbons.

The alkylation of hydrocarbons is an operation which is widely practiced in the art. For example, alkylate which is a highly useful motor fuel ingredient is manufactured on large scale by reacting a suitable isoparaffin such as isobutane with a suitable olefin such as a butene. Acidic catalysts, particularly sulfuric acid and hydrofluoric acid, are employed. It has been heretofore proposed to alkylate isoparaffins with olefins using as a catalyst solid acidic associations of refractory metal oxides such as alumina, silica, magnesia, thoria, boria, zirconia and the like. Our corresponding application Serial No. 735,388 filed May 15, 1958, discloses a particularly effective method for alkylating isoparaffin hydrocarbons with olefins using a particular type of catalyst.

In alkylation, the desired reaction is between the isoparaffin and olefin to produce a paraffin hydrocarbon. A competing reaction can take place, however, that reaction being one between molecules of the olefin itself, this reaction resulting in the production of a polymer of the olefin utilized as a starting material. Olefin polymers are undesirable constituents of the reaction product in that, since they are unsaturated, they are unstable and also in that they are of relatively low lead response, in comparison with paraffin compounds produced by reaction between the isoparaffin and the olefin. In order to suppress the formation of olefin polymers, the art has resorted to the expedient of introducing into the reaction zone a very large excess of the isoparaffin. This is undesirable because the excess of isoparaffin passes through the reaction zone unreacted and must be separated from the reaction products and recycled.

In accordance with our invention, we have discovered a method whereby the formation of olefin polymers in alkylating an isoparaffin with a monoolefin hydrocarbon using an acidic catalyst can be substantially reduced. This method involves introducing into the reaction zone, together with the isoparaffin and monoolefin hydrocarbon, an amount of lower aromatic hydrocarbon, or mixture of such aromatic hydrocarbons, which will substantially reduce the formation of olefin polymers. The aromatic hydrocarbon which we use is either benzene or an alkyl benzene containing not more than ten carbon atoms, for example, toluene, ethylbenzene, cumene, o-xylene, m-xylene p-xylene, hemimellitene, pseudocumene, mesitylene, p-cymene, m-diethylbenzene, p-diethylbenzene, durene, isodurene and the like. The aromatic hydrocarbon is generally introduced into the reaction zone in the amount of from 0.1 to 5 moles, per 100 moles of olefin introduced into the reaction zone.

Aside from the step of introducing the aromatic hydrocarbon for the purpose of suppressing the formation of olefin polymers, our process can be carried out employing the reactants, acidic catalysts and reaction conditions which have heretofore been proposed. Thus, the isoparaffin employed is generally isobutane or isopentane or a mixture thereof and the monoolefin hydrocarbon employed is ethylene, propylene, 1-butene, 2-butene, a pentene, a butene dimer and so forth. Solid acidic associations of refractory metal oxides employed as the catalyst can contain alumina, silica, magnesia, thoria, boria, zirconia and the like and can be, for example, silica-alumina, silica-magnesia, silicia-alumina-magnesia, silica-boria, alumina-boria, silica-zirconia, and so forth. Our application Serial No. 735,388 referred to above describes catalysts which can also be utilized in accordance with the process of our present invention. These catalysts consist essentially of at least one refractory metal oxide other than aluminum oxide, for example, boria or silica, supported on a base which essentially comprises calcined alumina which is characterized by large pore, high area structure essentially composed of gamma alumina modifications resulting from the drying and calcination of a mixture of precursor hydrous alumina phases containing at least about 65 percent of trihydrate, the base after calcining and before using having an area (BET method) of from about 350 to about 550 square meters per gram. Other acidic catalysts which are useful in practicing our present invention are sulfuric acid and hydrofluoric acid. The temperature employed in reacting the isoparaffin and the olefin will generally be within the range from about 30° F. to about 650° F. and the pressure used can be from atmospheric up to 1000 p.s.i.g. or more. Where the process is carried out by passing the mixture of isoparaffin, olefin and aromatic hydrocarbon through a fixed bed of the catalyst, the weight hourly space velocity (weight units of total feed per weight unit of catalyst per hour) used will generally be within the range from 0.01 to 5.

The following examples illustrate the invention:

*Example I*

An alumina base was prepared according to the method described in Example II of the Keith and Hauel application Serial No. 498,084, filed March 30, 1955, now Patent No. 2,867,588. After washing of the alumina gel, 0.11 weight percent chloride was found, based upon $Al_2O_3$. The washed hydrate was aged for 12 days at 90° F. and was then found to have a hydrate distribution as follows: boehmite, 21 percent; bayerite, 39 percent; randomite, 27 percent; and gibbsite, 10 percent (total trihydrate, 76 percent.) The alumina gel was drum-dried, extruded though 1/16 inch holes, and calcined by heating in flowing air at a top temperature of 480° C. The calcined alumina pellets were designated as I-XP-2 and has an area (BET method) of approximately 500 square meters per gram.

A portion of alumina pellets I-XP-2 was treated with boric acid to produce catalyst. Thus, 943 grams of I-XP-2 analyzing 920 grams ($Al_2O_3$) was placed in an evaporating dish. 141.8 grams of $H_3BO_3$ (equivalent to 80 grams of $B_2O_3$) was dissolved in 490 ml. of deionized water at 95° C. and poured over the pellets, just wetting them. The pellets were then mixed by hand, dried at 110° C., and calcined in a muffle furnace for two hours at 540° C. The calcined catalyst contained 7.87 weight percent of boria ($B_2O_3$).

100 grams of isobutane, 49 grams of propylene and 1.0 ml. of benzene were placed in a bomb having a capacity of 500 ml. together with 5 grams of the calcined catalyst. The mixture was heated at 200° C. (392° F.) for a period of approximately 26 hours to provide a 36 gram yield of product having an average molecular weight of 128 as determined by freezing point depression in benzene. 4 ml. of the product was capable of absorbing 420 cc. of gaseous hydrogen.

Comparison experiment A was performed using the same apparatus, the same amount of the same calcined catalyst, 100 grams of isobutane, 50 grams of propylene and no benzene. The mixture was heated at 150° C. (302° F.) for a period of approximately 18 hours to provide a 7.8 gram yield of product having an average molecular weight of 123 as determined by freezing point depression in benzene. These reaction conditions were chosen in order to provide a product having approximately the same average molecular weight as the product produced in the experiment described above in which benzene was also present in the reaction mixture. 4 ml. of the product was capable of absorbing 490 cc. of gaseous hydrogen.

Comparison experiment B was performed using the same apparatus, the same amount of the same calcined catalyst, 100 grams of propylene, no isobutane and no benzene being introduced into the reaction mixture. The reaction was carried out at a temperature of 120° C. (248° F.) for a period of 18 hours to provide a 12.5 gram yield of product having an average molecular weight of 133 as determined by freezing point depression in benzene. These reaction conditions were chosen in order to provide a product having approximately the same average molecular weight as the products produced in comparison experiment A and in the experiment described preceding comparison experiment A. 4 ml. of the product produced in comparison experiment B was capable of absorbing 565 cc. of gaseous hydrogen.

Infrared analysis of the products produced in the first example described above in which benzene was used, in comparison experiment A and in comparison experiment B showed that the product produced in the first example in which benzene was used had 44 percent less olefin unsaturation, and the product of comparison experiment A possessed 11 percent less olefin unsaturation than the product of comparison experiment B.

*Example II*

An alumina base was prepared according to the method described in Example II of the Keith and Hauel application Serial No. 498,084, filed March 30, 1955. After washing of the alumina gel, 0.11 weight percent chloride was found, based upon $Al_2O_3$. The washed hydrate was aged for 12 days at 90° F. and was then found to have a hydrate distribution as follows: boehmite, 21 percent; bayerite, 39 percent; randomite, 27 percent; and gibbsite, 10 percent (total trihydrate, 76 percent). The alumina gel was drum-dried, extruded through 1/16 inch holes, and calcined by heating in flowing air at a top temperature of 480° C. The calcined alumina pellets were designated as I–XP–2 and had an area (BET method) of approximately 500 square meters per gram.

A portion of alumina pellets I–XP–2 was treated with boric acid to produce catalyst. Thus, 861 grams of I–XP–2 (analyzing 840 grams $Al_2O_3$) was placed in an evaporating dish. 142 grams of $H_3BO_3$ was dissolved in 434 ml. of deionized water at about 95° C. and the solution was poured over the pellets. The pellets were then mixed, dried at 110° C., and calcined for 2 hours at 480° C. The pellets were again admixed with a solution prepared by dissolving 142 grams of $H_3BO_3$ in 434 ml. of deionized water at 95° C. Following the admixing, the pellets were dried at 110° C. and were calcined for 2 hours at 540° C. The calcined catalyst contained 15.66 weight percent of boria ($B_2O_3$).

97 grams of isobutane, 49 grams of propylene and 1 ml. of benzene were placed in a bomb having a capacity of 500 ml. together with 5 grams of the calcined catalyst, and the mixture was heated at 200° C. (392° F.) for a period of approximately 26 hours to provide a 30 gram yield of product having an average molecular weight of 132 determined by freezing point depression in benzene. 4 ml. of the product was capable of absorbing 400 cc. of gaseous hydrogen.

In comparison with the product produced in comparison experiment B, the product produced in accordance with the present example contained 52 percent less olefin unsaturation as determined by infrared analysis.

We claim:
1. In the alkylation of an isoparaffin with a monoolefin hydrocarbon wherein the isoparaffin and monoolefin hydrocarbon while in admixture with each other are passed into contact with a solid acidic catalyst consisting essentially of a mixture of refractory metal oxides, the step of introducing into the reaction mixture an aromatic compound selected from the group consisting of benzene and alkyl benzenes containing not more than ten carbon atoms whereby the formation of polymers is inhibited.
2. The method of claim 1 wherein said solid acidic catalyst is alumina-boria.
3. The method of claim 1 wherein said solid acidic catalyst consists essentially of boria supported on a base which essentially comprises calcined alumina which is characterized by large pore, high area structure essentially composed of gamma alumina modifications resulting from the drying and calcination of a mixture of precursor hydrous alumina phases containing at least about 65 percent of trihydrate, said base after calcining and before using having an area (BET method) of from about 350 to about 550 square meters per gram.
4. The method of claim 1 wherein the isoparaffin is isobutane.
5. The method of claim 1 wherein said monoolefin hydrocarbon is propylene.
6. The method of claim 1 wherein said aromatic compound is benzene.
7. The method of claim 1 wherein said solid acidic catalyst is alumina-boria, wherein the isoparaffin is isobutane, wherein said monoolefin hydrocarbon is propylene and wherein said aromatic compound is benzene.
8. In the alkylation of an isoparaffin with a monoolefin hydrocarbon wherein the isoparaffin and monoolefin hydrocarbon while in admixture with each other are passed into contact with a solid acidic catalyst consisting essentially of a mixture of refractory metal oxides, the step of introducing into the reaction mixture an aromatic compound selected from the group consisting of benzene and alkyl benzenes containing not more than 10 carbon atoms in the amount of from 0.1 to 5 moles per 100 moles of monoolefin whereby the formation of polymers is inhibited.

References Cited in the file of this patent
UNITED STATES PATENTS

| | | |
|---|---|---|
| 2,322,664 | Russell | June 22, 1943 |
| 2,401,865 | Gorin et al. | June 11, 1946 |
| 2,418,028 | Haensel | Mar. 25, 1947 |
| 2,867,588 | Keith et al. | Jan. 6, 1959 |